United States Patent Office

3,132,001
Patented May 5, 1964

3,132,001
PROCESS FOR THE GENERATION OF RECYCLE SOLUTIONS EMPLOYED FOR THE MANUFACTURE OF HYDROGEN PEROXIDE VIA INTERMEDIARY ALKYLANTHRAQUINONES
José Luis Denaeyer and Robert Jones, Brussels, Belgium, assignors to Solvay & Cie, Brussels, Belgium, a Belgian company
No Drawing. Filed Apr. 10, 1962, Ser. No. 186,317
Claims priority, application Belgium Apr. 28, 1961
4 Claims. (Cl. 23—207)

The present invention relates to a process for the regeneration of recycle solutions employed for the manufacture of hydrogen peroxide by repeated cycles of catalytic hydrogenation of an alkylanthraquinone and the oxidation of the alkylanthrahydroquinone thus produced.

2-ethylanthraquinone and 2-tert. butylanthraquinone have been extensively cited as suitable quinones, and the literature describes a wide range of solvents. Generally, a miscible mixture of a solvent for the quinone form and of a solvent for the hydroquinone form is used. As solvents for the hydroquinones, secondary aliphatic alcohols, particularly secondary alcohols having 7 to 11 carbon atoms such as octanol-2, diisobutylcarbinol, and primary alcohols such as heptanol, methylcyclohexanol, etc., are used, and for dissolving quinones, aromatic hydrocarbons, particularly the $C_6$ to $C_9$ fractions, naphthalene, tetrahydronaphthalene, alkyl derivatives of naphthalene, anisole, chlorinated hydrocarbons etc. are used.

In a process of this type, continuous recycling of the recycle solution causes the formation of decomposition products of alkylanthraquinones. Some of these products are inert, i.e. unfit for the production of hydrogen peroxide. Their presence in the recycle solution is the cause of many disadvantages, among which may be mentioned the need for periodic addition of fresh quinone to compensate for that rendered inactive by decomposition, in order to maintain the production capacity of the plant. This causes an increase in the specific gravity of the recycle solution, so as to make the extraction by water of the hydrogen peroxide liberated during the oxidation appreciably more complicated.

Likewise, a partial transformation of the alkylanthraquinone to the corresponding alkyltetrahydroanthraquinone is brought about. This latter, which results from the hydrogenation of the aromatic nucleus, is not inert but like alkylanthraquinone possesses a certain capacity for the production of hydrogen peroxide.

A number of solutions have already been proposed to effect the regeneration of decomposition products of quinone to active quinones, notably treatment by means of oxygen or by another oxidising agent, in the presence of a mineral or organic base. The major drawback of a process of this type consists in the oxidation of the solvents in the recycle solution.

The applicants have now discovered that the regeneration of recycle solutions of alkylanthraquinone can be achieved with advantage by treating all or part of the decomposed solution by a hydroxide of an alkali metal in the absence of an oxidising agent, and optionally by separating the tetrahydroquinone formed, and by treating it separately by a method known as such, so as to transform it to the corresponding quinone.

The treatment of the recycle solution by an alkali metal hydroxide permits a large fraction of the inert decomposition products to be transformed to alkyltetrahydroanthraquinone without oxidation of the solvents in the recycle solution.

Although the alkyltetrahydroquinone possesses a certain capacity for the production of hydrogen peroxide, it is nevertheless of interest to limit its content in the recycle solution: in fact, since its rate of oxidation is lower than that of the quinone non-hydrogenated at the nucleus, it leads to a reduction in the conversion rate and hence in the production capacity for hydrogen peroxide. Moreover, since its solubility is generally less than that of the corresponding quinone non-hydrogenated at the nucleus, there is the risk that if the concentration becomes too high, it will separate out during the process of manufacturing hydrogen peroxide. It is thus of particular advantage to separate by cooling and subsequent precipitation a large part of the alkyltetrahydroanthraquinone formed during the regeneration treatment, and to treat it separately, for instance by oxidation in an alkaline medium, in order to transform it to the corresponding quinone. This latter can then be recycled in its turn.

The basic reagents which are particularly suitable are caustic soda and potash, in the solid state as well as in solution in water, in alcohol, or in other solvents. Ammonia in the gaseous state gives less good results.

The regeneration can be carried out continuously as well as discontinuously. The treatment can be applied to the whole of the recycle solution or only to a part thereof.

The regeneration is already achieved when the basic reagent is present at the rate of 0.1% on the amount of recycle solution to be treated.

In solution, experiments have preferably been carried out at a 5 N concentration, but good regeneration is also obtained with 1 to 10 N NaOH or KOH solutions.

In order to prevent the dissolution of hydroquinones in the aqueous phase, the recycle solution must be treated after completion of the oxidation stage.

The treatment is already attained when it is carried out at room temperature. It is of advantage to operate at a higher temperature, optionally at the boiling temperature of the reaction medium.

By operating in accordance with the process which forms the object of the invention, the oxidation of the solvents for the alkylanthraquinones is avoided. Moreover, the regeneration can be carried out at an elevated temperature without loss of solvent, which proves extremely difficult when treatment is carried out in the presence of an oxidising agent, air or oxygen for example.

The process is applicable whatever the nature of the alkyl substituents of the anthraquinone and whatever the solvents or solvent mixtures employed.

In the following examples, the alkylanthraquinone, for example the 2-ethyl, 2-propyl, tert. butyl-, amyl, octylanthraquinones, are dissolved in a mixture of approximately equal volumes of an aromatic hydrocarbon and of a secondary alcohol with 9 C-atoms. However, solutions prepared by means of other solvents can be treated in the same manner for the regeneration of decomposed alkylanthraquinones.

*Example 1*

Hydrogen peroxide is manufactured with the aid of a recycle solution whose initial alkylanthraquinone content is 264 g./kg. After a large number of recycling, this solution only contains 156 g. per kg. of active quinones, consisting of 122 g. of alkylanthraquinone and 34 g. of alkyltetrahydroanthraquinone, 100 g. of this solution are treated, whilst boiling, with 0.1 g. of NaOH cubes for 15 minutes in the absence of air. After separation of the alkali and washing with water acidified with dilute $HNO_3$, the active quinone content of the solution is 226 g./kg., being 125 g. of alkylanthraquinone and 101 g. of alkyltetrahydroanthraquinone. An amount of alkyltetrahydroanthraquinone corresponding to 38 g./kg. of solution separates from the solution as it is restored to room temperature.

Example 2

A recycle solution of a composition similar to that in Example 1 is regenerated by passing through a column of NaOH cubes heated to 40° C. Its composition after this treatment is 204 g. of active quinones per kg. of solution, being 126 g. of alkylanthraquinone and 98 g. of alkyltetrahydroanthraquinone. It is cooled to −45° C., and 68 g. of alkyltetrahydroanthraquinone per kg. of solution are recovered by precipitation. This alkyltetrahydroanthraquinone is oxidised by air according to the methods of Diels, Alder, and Stein (Ber. Dtsch. Chem. Ges. 1929, 62, p. 2337, 372), and the corresponding alkylanthraquinone is reintroduced into the recycle solution.

Example 3

200 g. of the recycle solution of Example 1 are treated with 30 cc. of 5 N NaOH whilst boiling during 15 minutes in the absence of air. After washing with water, the active quinone content in the organic phase is 218 g. per kg., being 122 g. of alkylanthraquinone and 96 g. of alkyltetrahydroanthraquinone. On cooling to −40° C., the amount of alkyltetrahydroanthraquinone, which precipitates, is 66 g./kg. of solution.

Example 4

200 g. of the same recycle solution are stirred at room temperature with 50 cc. of 5 N NaOH. After treatment for 15 minutes, the active quinone content in the organic phase is 184 g./kg. (alkylanthraquinone 120, alkyltetrahydroanthraquinone 64) and after 24 hours it is 229 g./kg. (alkylanthraquinone 126, alkyltetrahydroanthraquinone 103). On cooling to −30° C., 67 g. of alkyltetrahydroanthraquinone per kg. of solution are precipitated.

Example 5

Hydrogen peroxide is manufactured with the aid of a recycle solution, whose initial alkylanthraquinone content is 195 g./kg. After a large number of recycling, this solution only contains 117 g. of active quinones per kg., consisting of 74 g. of alkylanthraquinone and 43 g. of alkyltetrahydroanthraquinone.

This recycle solution is contacted under an inert atmosphere for 5 hrs. at room temperature with an alcoholic solution of 1 N KOH. After this treatment, its active quinone content is 167 g./kg., being 115 g. of alkylanthraquinone and 52 g. of alkyltetrahydroanthraquinone. It is cooled to −45° C., and 22 g. of alkyltetrahydroanthraquinone per kg. are recovered by precipitation.

Example 6

A recycle solution of the same composition as that in Example 5 is treated for 6 hrs. at room temperature by agitation with gaseous ammonia. Its active quinone content is then 130 g./kg. (82 g. of alkylanthraquinone and 48 g. of alkyltetrahydroanthraquinone).

On cooling to −25° C., 11 g. of alkyltetrahydroanthraquinone per kg. are recovered.

Example 7

Hydrogen peroxide is manufactured with the aid of a recycle solution whose initial alkylanthraquinone content is 250 g./kg. After a large number of recycling, this solution only contains 117 g. of active quinones per kg., consisting of 73 g. of alkylanthraquinone and 44 g. of alkyltetrahydroanthraquinone.

3.6 litres of this solution are heated at 65° C. for 1 hr. with 30 cc. of 50% NaOH and 500 cc. of ethyl alcohol. After treatment, the active quinone content is 246 g./kg. (106 g. of alkylanthraquinone and 140 g. of alkyltetrahydroanthraquinone).

On cooling to −25° C., 95 g. of alkyltetrahydroanthraquinone per kg. separate.

We claim:

1. The method of regenerating the inert regenerable materials to tetrahydroanthraquinone in a solution of an intermediate selected from the group consisting of alkylanthraquinones, alkyltetrahydroanthraquinones and mixtures thereof in a solvent therefor, which solution has become degraded through use in cyclic reduction and oxidation operations in the production of hydrogen peroxide wherein the hydrogen peroxide is produced in an oxidation phase and is then extracted from the solution, said degraded solution containing degradation products which are regeneratable to alkylanthraquinones, and degradation products which are not regeneratable to alkylanthraquinones, said method comprising the steps of treating said degraded solution, after the oxidation phase and after the extraction of hydrogen peroxide, with at least 0.1% by weight referred to the weight of said degraded solution to be treated, of an alkali metal hydroxide selected from the group consisting of sodium hydroxide and potassium hydroxide at ambient temperature to the boiling point of said degraded solution, in the absence of an oxidizing agent, to regenerate the regeneratable degradation products to alkyltetrahydroanthraquinones, and separating the thus-regenerated solution from said alkali metal hydroxide.

2. The method defined in claim 1, wherein the alkali metal hydroxide is selected from the group consisting of solid caustic soda and solid caustic potash.

3. The method defined in claim 1, wherein said alkali metal hydroxide is used in the form of a solution, the solvent for said solution being selected from the group consisting of water and alcohol.

4. The method defined in claim 1 and the additional steps of cooling said regenerated solution to a temperature lower than ambient temperature to precipitate at least a part of the alkyltetrahydroanthraquinones, separating the precipitate from said regenerated solution, and treating the precipitate with a dehydrogenation agent to transform it to the corresponding alkylanthraquinone, and dissolving said alkylanthraquinone into the regenerated solution.

References Cited in the file of this patent

UNITED STATES PATENTS

| | | |
|---|---|---|
| 2,756,243 | Umhoefer | July 24, 1956 |
| 2,860,036 | Lait | Nov. 11, 1958 |
| 2,901,491 | Eller et al. | Aug. 25, 1959 |
| 2,909,532 | Cosby et al. | Oct. 20, 1959 |

FOREIGN PATENTS

| | | |
|---|---|---|
| 838,939 | Great Britain | June 22, 1960 |